US011768577B1

(12) United States Patent
Zhou et al.

(10) Patent No.: US 11,768,577 B1
(45) Date of Patent: *Sep. 26, 2023

(54) SYSTEMS AND METHODS FOR PROVIDING A USER INTERFACE FOR AN ENVIRONMENT THAT INCLUDES VIRTUAL OBJECTS

(71) Applicant: META PLATFORMS TECHNOLOGIES, LLC, Menlo Park, CA (US)

(72) Inventors: Kai Zhou, Wr. Neudorf (AT); Daniel Wagner, Vienna (AT)

(73) Assignee: Meta Platforms Technologies, LLC, Menlo Park, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 17/496,009

(22) Filed: Oct. 7, 2021

Related U.S. Application Data (63) Continuation of application No. 16/915,703, filed on Jun. 29, 2020, now Pat. No. 11,163,418, which is a
(Continued)

(51) Int. Cl.
*G06F 3/04815* (2022.01)
*G06T 15/08* (2011.01)
(Continued)

(52) U.S. Cl.
CPC .......... *G06F 3/04815* (2013.01); *G06T 15/08* (2013.01); *G06T 19/006* (2013.01);
(Continued)

(58) Field of Classification Search
None
See application file for complete search history.

(56) References Cited

U.S. PATENT DOCUMENTS 2,020,007 A 11/1935 Wagman
10,698,562 B1 * 6/2020 Zhou ....................... G06T 15/08
(Continued)

OTHER PUBLICATIONS

Gobbetti E., et al., "Far Voxels: A Multiresolution Framework for Interactive Rendering of Huge Complex 3D Models an Commodity Graphics Platforms," ACM Special Interest Group on Computer Graphics and Interactive Techniques (SIGGRAPH), 2005, pp. 878-885, 8 pages.

(Continued)

*Primary Examiner* — Ryan M Gray
(74) *Attorney, Agent, or Firm* — Fenwick & West LLP (57) ABSTRACT

Systems and methods for providing and/or presenting, to a user, a user interface for an environment that includes virtual objects are disclosed. Exemplary implementations may: obtain, from electronic storage, information regarding virtual objects in a virtual three-dimensional space that has a virtual three-dimensional volume; determine a subset of voxels from the set of voxels such that the subset of voxels encompasses a three-dimensional volume that includes at least part of a first external surface of the first virtual object; determine proximity information for the first virtual object; determine a manipulation granularity; adjust the manipulation granularity based on the proximity information; receive particular user input from the user having a particular input magnitude; manipulate the first virtual object within the virtual three-dimensional space in accordance with the received particular user input; and effectuate presentation of the user interface to the user through a client computing platform.

17 Claims, 4 Drawing Sheets

Related U.S. Application Data continuation of application No. 16/399,376, filed on Apr. 30, 2019, now Pat. No. 10,698,562.

(51) Int. Cl.
  G06T 19/00 (2011.01)
  G06T 19/20 (2011.01)

(52) U.S. Cl.
  CPC ...... G06T 19/20 (2013.01); *G06T 2219/2012* (2013.01); *G06T 2219/2016* (2013.01)

(56) References Cited

U.S. PATENT DOCUMENTS

| | | |
|---|---|---|
| 2002/0113787 A1 | 8/2002 | Ray et al. |
| 2005/0151734 A1 | 7/2005 | Gubkin et al. |
| 2006/0164410 A1* | 7/2006 | Li .................. G06T 15/08 345/419 |
| 2007/0018973 A1 | 1/2007 | Shih et al. |
| 2017/0031502 A1* | 2/2017 | Rosenberg .......... G06F 3/04166 |
| 2017/0323471 A1 | 11/2017 | Chien et al. |
| 2018/0322701 A1* | 11/2018 | Pahud .................. G06F 3/038 |
| 2019/0180499 A1* | 6/2019 | Caulfield ............... G06F 17/16 |
| 2019/0385355 A1 | 12/2019 | Xu |
| 2020/0043214 A1* | 2/2020 | Velevski ................ G06T 15/08 |
| 2020/0043240 A1* | 2/2020 | Abe ...................... A63F 13/35 |
| 2020/0054398 A1* | 2/2020 | Kovtun ................. G16H 40/63 |
| 2020/0074718 A1 | 3/2020 | Takahashi |
| 2021/0056748 A1* | 2/2021 | Pritchett ................ G06T 13/40 |
| 2021/0134069 A1* | 5/2021 | Sorrento ................ G06F 3/017 |

OTHER PUBLICATIONS

Miarchesin S., et al., "Multi-GPU Sort-Last Volume Visualization," Eurographics Symposium on Parellel Graphics and Visualization, 2008, 8 pages.

Notice of Allowance dated Apr. 30, 2020 for U.S. Appl. No. 16/399,376, filed Apr. 30, 2019, 8 pages.

* cited by examiner

SYSTEMS AND METHODS FOR PROVIDING A USER INTERFACE FOR AN ENVIRONMENT THAT INCLUDES VIRTUAL OBJECTS

PRIORITY APPLICATION

This application is a continuation and claims priority to U.S. Non-Provisional application Ser. No. 16/915,703, filed Jun. 29, 2020, which is a continuation and claims priority to U.S. Non-Provisional application Ser. No. 16/399,376, filed Apr. 30, 2019, now U.S. Pat. No. 10,698,562, the disclosure of each of which is incorporated herein in its entirety by reference.

FIELD OF THE DISCLOSURE

The present disclosure relates to systems and methods for providing, to users, user interfaces for environments that includes virtual objects.

BACKGROUND

Virtual environments that include virtual objects are known, e.g. as used in Virtual Reality (VR) technology and Augmented Reality (AR) technology.

SUMMARY

One aspect of the present disclosure relates to a system configured for providing, to a user, a user interface for an environment that includes virtual objects. The system may include one or more hardware processors configured by machine-readable instructions. The processor(s) may be configured to obtain, from electronic storage, information regarding virtual objects in a virtual three-dimensional space. The virtual three-dimensional space may have a virtual three-dimensional volume. The virtual objects may include a first virtual object. The virtual three-dimensional space may include a set of voxels. Individual voxels may correspond to individual virtual three-dimensional volumes within the virtual three-dimensional space such that the virtual three-dimensional space is divided as the three-dimensional volumes of the set of voxels. Individual voxels may be associated with individual distance values. The individual distance values may represent distances from the individual voxels to real or virtual surfaces, e.g., within the virtual three dimensional space. The processor(s) may be configured to determine a subset of voxels from the set of voxels such that the subset of voxels encompasses a three dimensional volume that includes at least part of a first external surface of the first virtual object. The processor(s) may be configured to determine proximity information for the first virtual object. Determination of the proximity information may be based on aggregating a set of distance values for the determined subset of voxels. A reduction in magnitude of the proximity information may correspond to a reduction in one or more distances between the first virtual object and one or more real or virtual surfaces, e.g., within the virtual three dimensional space. The processor(s) may be configured to determine a manipulation granularity. The manipulation granularity may correlate an input magnitude of user input to an output magnitude of one or more manipulations of the first virtual object within the virtual three dimensional space. The one or more manipulations may include one or more of translation, rotation, transformation, and/or other manipulations. The processor(s) may be configured to adjust the manipulation granularity based on the proximity information. Adjustment of the manipulation granularity may be performed such that the reduction in magnitude of the proximity information corresponds to an increase in the manipulation granularity. The processor(s) may be configured to receive particular user input from the user having a particular input magnitude. The particular user input may represent a request to manipulate the first virtual object within the virtual three dimensional space. The processor(s) may be configured to manipulate the first virtual object within the virtual three dimensional space in accordance with the received particular user input. A particular output magnitude of the manipulation of the first virtual object as requested may be based on the particular input magnitude and the adjusted manipulation granularity. The processor(s) may be configured to effectuate presentation of the user interface to the user through a client computing platform. The user interface may depict the manipulation of the first virtual object within the virtual three-dimensional space.

Another aspect of the present disclosure relates to a method for providing, to a user, a user interface for an environment that includes virtual objects. The method may include obtaining, from electronic storage, information regarding virtual objects in a virtual three-dimensional space. The virtual three-dimensional space may have a virtual three-dimensional volume. The virtual objects may include a first virtual object. The virtual three-dimensional space may include a set of voxels. Individual voxels may correspond to individual virtual three-dimensional volumes within the virtual three-dimensional space such that the virtual three-dimensional space is divided as the three-dimensional volumes of the set of voxels. Individual voxels may be associated with individual distance values. The individual distance values may represent distances from the individual voxels to real or virtual surfaces, e.g., within the virtual three-dimensional space. The method may include determining a subset of voxels from the set of voxels such that the subset of voxels encompasses a three-dimensional volume that includes at least part of a first external surface of the first virtual object. The method may include determining proximity information for the first virtual object. Determination of the proximity information may be based on aggregating a set of distance values for the determined subset of voxels. A reduction in magnitude of the proximity information may correspond to a reduction in one or more distances between the first virtual object and one or more real or virtual surfaces, e.g., within the virtual three-dimensional space. The method may include determining a manipulation granularity. The manipulation granularity may correlate an input magnitude of user input received from the user to an output magnitude of one or more manipulations of the first virtual object within the virtual three-dimensional space. The one or more manipulations may include one or more of translation, rotation, transformation, and/or other manipulations. The method may include adjusting the manipulation granularity based on the proximity information. Adjustment of the manipulation granularity may be performed such that the reduction in magnitude of the proximity information corresponds to an increase in the manipulation granularity. The method may include receiving particular user input from the user having a particular input magnitude. The particular user input may represent a request to manipulate the first virtual object within the virtual three-dimensional space. The method may include manipulating the first virtual object within the virtual three-dimensional space in accordance with the received particular user input. A particular output magnitude of the manipulation of the first virtual object as requested may be based on the particular input magnitude and the adjusted manipulation granularity. The method may include effectuating presentation of the user interface to the user through a client computing platform. The user interface may depict the manipulation of the first virtual object within the virtual three-dimensional space.

As used herein, any association (or relation, or reflection, or indication, or correspondency) involving servers, processors, client computing platforms, virtual objects, virtual volumes, determinations, selections, voxels, distances, values, surfaces, proximities, granularities, magnitudes, sensitivities, adjustments, manipulations, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
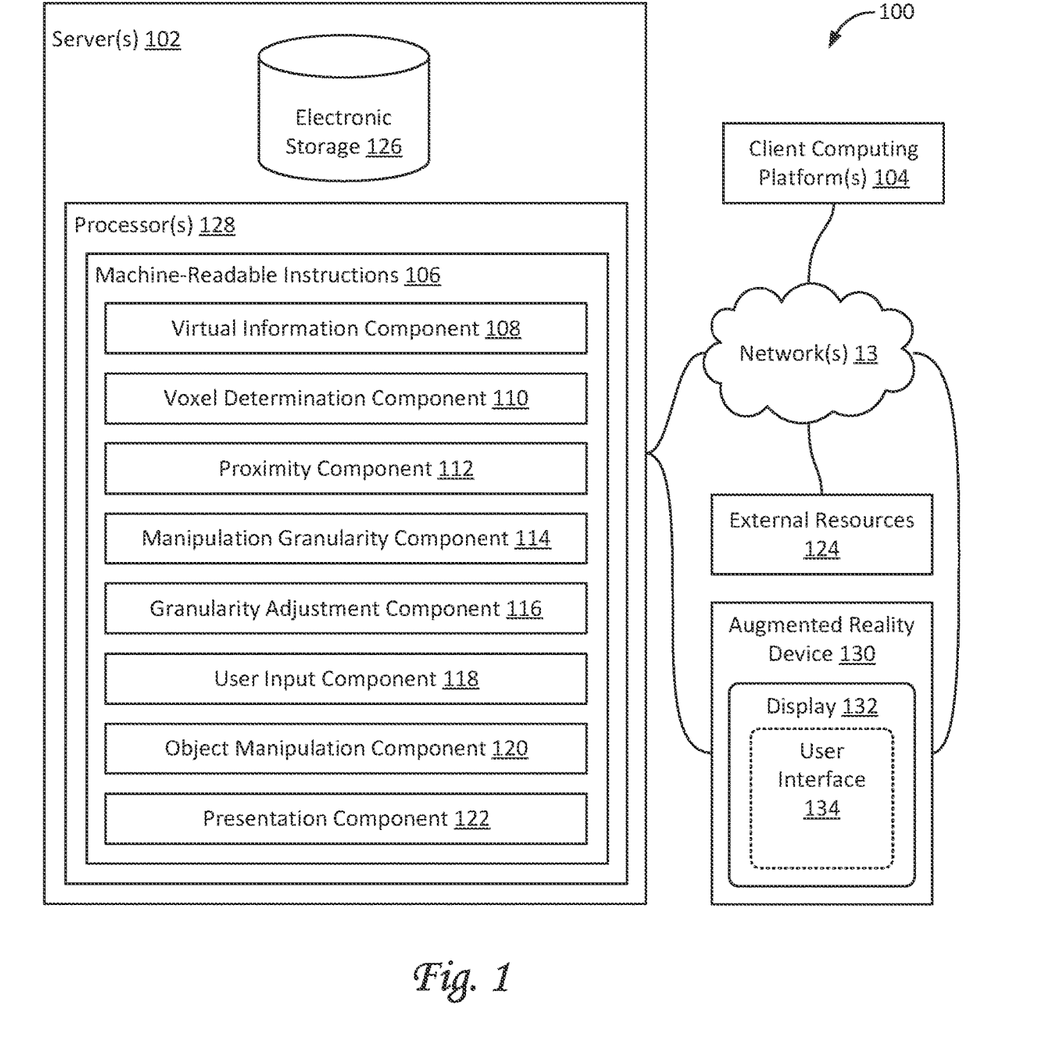
FIG. 1 illustrates a system configured for providing, to a user, a user interface for an environment that includes virtual objects, in accordance with one or more implementations.

FIG. 1 illustrates a system 100 configured for providing and/or presenting, to a user, a user interface 134 for an environment that includes virtual objects, in accordance with one or more implementations. In some implementations, the environment may be a virtual reality environment, which may immerse users in a fully artificial digital environment. In some implementations, the environment may be an augmented reality environment, which may present views of user interface 134 superimposed over views of the real world to users, such that both types of views are presented simultaneously. In some implementations, positions of one or more virtual objects may be related to positions of one or more (corresponding) objects in the real world. In some implementations, the environment may be a mixed reality environment, in which virtual objects and real-world objects co-exist and interact, e.g., in real-time. In some implementations, virtual objects (and/or elements thereof) may be anchored to real-world objects (and/or elements thereof), thereby enabling a shared reference frame and/or world coordinate system between virtual objects and real-world objects.

In some implementations, system 100 may include one or more servers 102, one or more hardware processor(s) 128, electronic storage 126, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. In some implementations, system 100 may include an augmented reality device 130 that includes a display 132.

Server(s) 102 and/or hardware processor(s) 128 may be configured by machine-readable instructions 106. Machine-readable instructions 106 may include one or more instruction components. The instruction components may include computer program components. The instruction components may include one or more of virtual information component 108, voxel determination component 110, proximity component 112, manipulation granularity component 114, granularity adjustment component 116, user input component 118, object manipulation component 120, presentation component 122, and/or other instruction components.

Figure 3A:
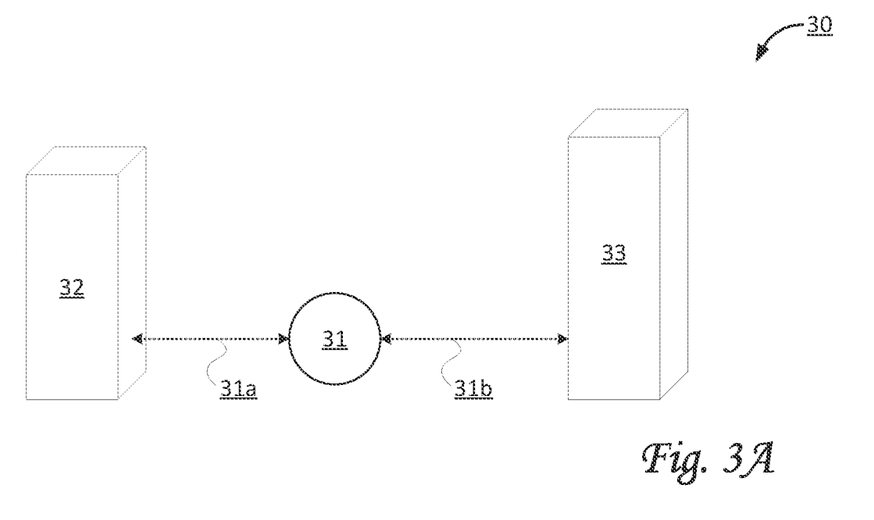
FIG. 3A-3B illustrate exemplary environments that include virtual objects, as may be used by a system configured for providing a user interface, in accordance with one or more implementations.

Virtual information component 108 may be configured to determine and, or obtain information regarding virtual objects in a virtual three-dimensional space. In some implementations, the virtual three-dimensional space may have a virtual three-dimensional volume. In some implementations, virtual information component 108 may be configured to obtain information regarding virtual objects from electronic storage 126. In some implementations, positions of one or more of the virtual objects may be related to positions of one or more objects in the real world. For example, a real-world three-dimensional volume may be scanned and constructed (or reconstructed) in a simulation or model, using a virtual three-dimensional space having a virtual three-dimensional volume that corresponds to (at least part of) the real-world three-dimensional volume. The virtual objects may include a first virtual object, a second virtual object, a third virtual object, and so forth. By way of non-limiting example, FIG. 3A illustrates an exemplary environment 30 that includes a virtual object 31 (in this example virtual object 31 is a sphere), a second object 32, and a third object 33. In some implementations, second object 32 may be a second virtual object and third object 33 may be a third virtual object. Alternatively, in some implementations, exemplary environment 30 may include real-world objects (e.g., objects 32 and 33) viewed by and/or presented to a user simultaneously with virtual object 31. As depicted in exemplary environment 30, a distance 31a may represent the shortest distance from any point on the surface of virtual object 31 to any point on the surface of object 32. As depicted in exemplary environment 30, a distance 31b may represent the shortest distance from any point on the surface of virtual object 31 to any point on the surface of object 33.

Figure 4A:
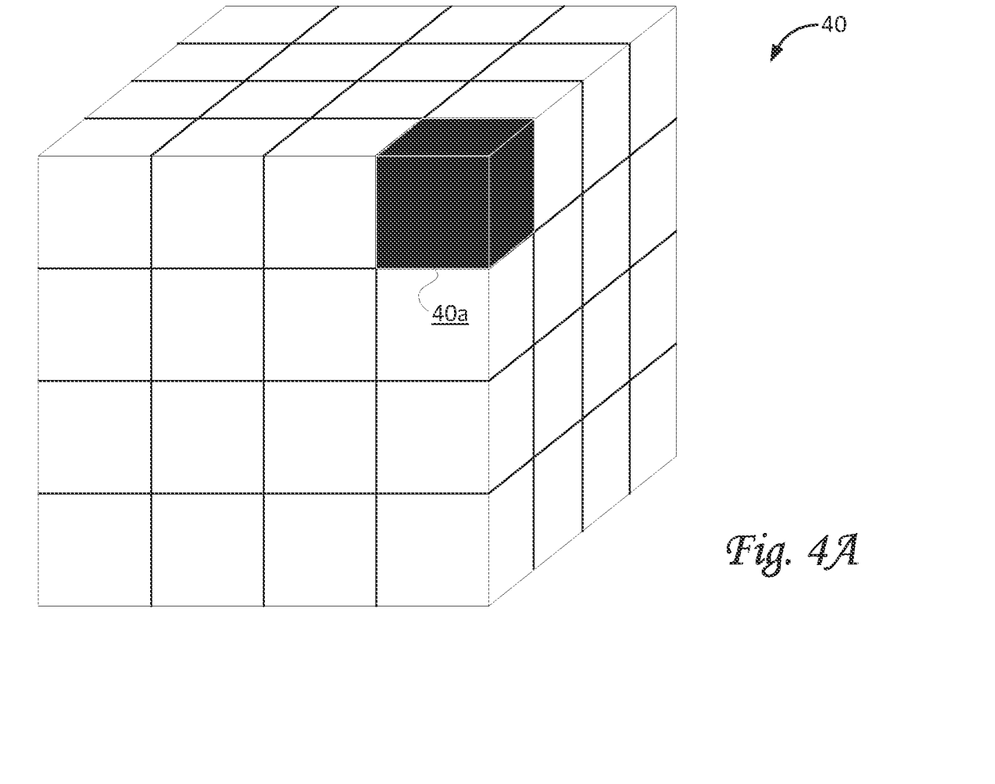
FIG. 4A-4B illustrate exemplary sets of voxels as may be used by a system configured for providing a user interface, in accordance with one or more implementations.
Figure 4B:
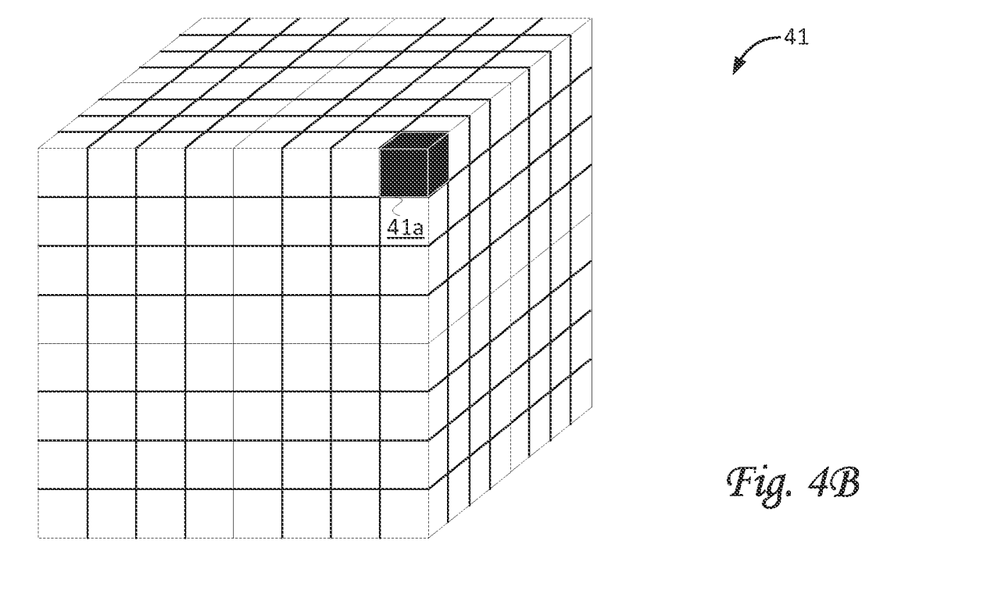

The virtual three-dimensional space may include a set of voxels. Individual voxels may correspond to individual virtual three-dimensional volumes within a virtual three-dimensional space (e.g., within the same virtual three-dimensional space that includes the virtual objects described in relation to virtual information component 108). In some implementations, individual voxels may correspond to individual virtual three-dimensional volumes such that the virtual three-dimensional space is divided as the three-dimensional volumes of the set of voxels. In some implementations, the set of voxels may be a grid of voxels that form at least part of the virtual three-dimensional volume of the virtual three-dimensional space. By way of non-limiting example, FIG. 4A illustrates an exemplary set of voxels 40 that may be used by system 100. As depicted in FIG. 4A, set of voxels 40 is a 4×4×4 grid of voxels that includes an individual voxel 40a. The volume of a particular virtual object within the virtual three-dimensional volume formed by set of voxels 40 may be approximated by the sum of the volumes of a subset of individual voxels. For example, in some implementations, an individual voxel may be included in such a subset if the volume of the individual voxel is completely within the volume of the particular virtual object. Alternatively, in some implementations, an individual voxel may be included in such a subset if the volume of the individual voxel overlaps to any extent with the volume of the particular virtual object. Alternatively, in some implementations, an individual voxel may be included in such a subset if the volume of the individual voxel overlaps or at least a predetermined percentage (say, 50%) with the volume of the particular virtual object. Alternate definitions for inclusion or exclusion of such a subset are envisioned within the scope of this disclosure. As the size of individual voxels is reduced and/or the resolution of the set of voxels is increased, the shape and volume of a subset of voxels may more closely approximate the particular virtual object. By way of non-limiting example, FIG. 4B illustrates an exemplary set of voxels 41 that may be used by system 100. As depicted in FIG. 4B, set of voxels 41 is an 8×8×8 grid of voxels that includes an individual voxel 41a. In some implementations, set of voxels 41 may be formed by dividing each voxel in set of voxels 40 (FIG. 4A) into 8 smaller voxels.

Individual voxels may be associated with individual distance values. The individual distance values may represent distances from the individual voxels to real or virtual surfaces, e.g., within the virtual three-dimensional space. In some implementations, an individual distance value associated with an individual voxel may represent the shortest distance from the individual voxel to any surface within the virtual three-dimensional space. In some implementations, an individual distance value associated with an individual voxel may represent the shortest distance from the individual voxel to any surface within the virtual three-dimensional space of a subset of virtual objects. For example, subsequent to a user selecting a particular virtual object, an individual distance value associated with an individual voxel may represent the shortest distance from the individual voxel to any surface within the virtual three-dimensional space of the subset of virtual objects that excludes the selected particular virtual object. By way of non-limiting example, in FIG. 3A, a user may have selected virtual object 31. Assume the left-most point of virtual object 31 intersects a first voxel (not depicted), and the right-most point of virtual object 31 intersects a second voxel (not depicted). As depicted in exemplary environment 30, a distance 31a may represent the shortest distance from the first voxel to any point on the surface of any other virtual object within exemplary environment 30 (i.e. the closest surface of any virtual object except selected virtual object 31, which in this case may be a point on the surface of virtual object 32). As depicted in exemplary environment 30, a distance 31b may represent the shortest distance from the second voxel to any point on the surface of any other virtual object within exemplary environment 30 (i.e. the closest surface of any virtual object except selected virtual object 31, which in this case may be a point on the surface of virtual object 33). In some implementations, individual distance values associated with the individual voxels may be Truncated Signed Distance Function (TSDF) values.

Referring to FIG. 1, subset determination component 110 may be configured to determine subsets of voxels from a set of voxels such that the subsets of voxels encompasses three-dimensional volumes that includes all or part of particular virtual objects, such as user-selected virtual objects. For example, for a particular virtual object selected by a user, subset determination component 110 may be configured to determine a particular subset of voxels (e.g., from a grid of voxels that forms a particular virtual three-dimensional volume) that approximates and/or encompasses the volume and/or the external surface of the particular virtual object. In some implementations, system 100 may he configured to determine a three-dimensional bounding box that fully encompasses a selected virtual object. Subset determination component may be configured to determine a subset of voxels such that its combined volume approximated and/or matches the volume of the bounding box.

Figure 3B:
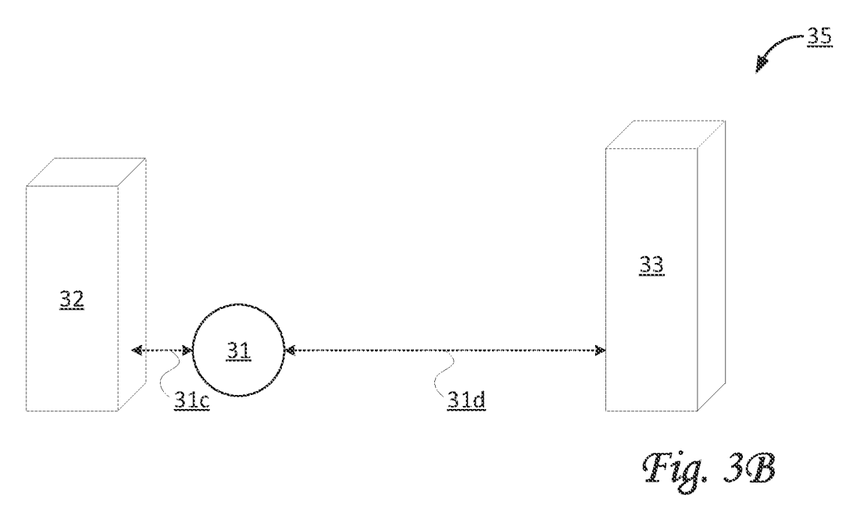

Proximity component 112 may be configured to determine proximity information for virtual objects, including but not limited to user-selected virtual objects. In some implementations, the particular proximity information for a particular virtual object in a virtual three-dimensional space may be the distance to the closest surface and/or object within the virtual three-dimensional space that is not (a surface of) the particular virtual object. Determination of the proximity information may be based on aggregating a set of distance values for a particular set of voxels, such as the subset of voxels determined by subset determination component 110. Determining the proximity information for a particular virtual object may include determining a minimum absolute distance in the set of distance values for the particular set of voxels, such as the subset of voxels determined by subset determination component 110. For example, as the particular virtual object is moved closer to the nearest other object, the (magnitude of) proximity information for the particular virtual object may become smaller. In some implementations, a reduction in magnitude of the proximity information may correspond to a reduction in one or more distances between the first virtual object and one or more surfaces within the virtual three-dimensional space. By way of non-limiting example, in FIG. 3A, the value of distance 31a may represent the proximity information of virtual object 31, which is the shortest distance from virtual object 31 to any surface of any other virtual object within exemplary environment 30. Assume a user moves virtual object closer to virtual object 32, as depicted in FIG. 3B and exemplary environment 35 (compared to FIG. 3A and exemplary environment 30). In FIG. 3B, the value of a distance 31c may represent the proximity information of virtual object 31, which is the shortest distance from virtual object 31 to any surface of any other virtual object within exemplary environment 35, in this case virtual object 32. As depicted in FIGS. 3A and 3B, as virtual object 31 is moved closer to the nearest other object, virtual object 32, the (magnitude of the) proximity information for virtual object 31 may become smaller, since distance 31c may be smaller than distance 31a. A reduction in magnitude of the proximity information of virtual object 31 (when comparing FIG. 3A to FIG. 3B) may correspond to a reduction in the shortest distance between virtual object 31 and the nearest (surface of) another virtual object within the virtual three-dimensional space.

Referring to FIG. 1, user input component 118 may be configured to receive particular user input from the user. In some implementations, particular user input may have a particular input magnitude. User input may represent a selection of one or more virtual objects from the virtual objects in a virtual three-dimensional space. In some implementations, user input may represent a selection of one or more manipulations to be applied, for example to a selected virtual object. In some implementations, the particular user input may represent a request to manipulate a selected virtual object within the virtual three-dimensional space. By way of non-limiting example, the one or more manipulations may include one or more of translation, rotation, transformation, and/or other manipulations. In some implementations, a transformation may include one or more of a translation, rotation, scaling, reflection, and/or shearing. For example, in some implementations, manipulations may include increasing or decreasing the relative size of a selected virtual object. For example, in some implementations, manipulations may include zooming in or zooming out within user interface 134. Other manipulations as well as combinations of manipulations are envisioned within the scope of this disclosure. In some implementations, a particular manipulation of a particular selected virtual object may include a combination of one or more of a translation, a rotation, and/or a scaling.

Referring to FIG. 1, manipulation granularity component 114 may be configured to determine a manipulation granularity and/or a manipulation sensitivity, which may be a characteristic of user interface 134 and/or its environment (including the virtual three-dimensional space). The manipulation granularity may correlate an input magnitude of user input received from the user to an output magnitude of one or more manipulations of a selected virtual object within the virtual three-dimensional space. In some implementations, input sensitivity defines how sensitive manipulations of selected virtual objects are to input received from user.

User input may be received through a keyboard, buttons, touchscreen, mouse, voice commands, body movement, hand and/or finger gestures, and/or other ways to convey user input to system 100. Individual types of user input may correspond to an input magnitude, such that user input received at different times may be distinguished and have different effects by virtue of the input magnitude. For example, a first mouse movement may be a few mm or a small distance, whereas a second mouse movement may be a few inches or a larger distance. For example, a first hand gesture may involve moving hands or fingers by an inch, whereas a second hand gesture may involve moving hands or fingers by 6-12 inches. For example, a first body movement may involve rotating the head or body by 10 degrees, whereas a second body movement may involve rotating the head or body by 60 degrees. The first mouse movement may have a smaller magnitude than the second mouse movement, the first hand gesture may have a smaller magnitude than the second hand gesture, and the first body movement may have a smaller magnitude than the second body movement.

Individual types of manipulations of virtual objects may correspond to an output magnitude, such that manipulations performed at different times may be distinguished and have different effects by virtue of the output magnitude. For example, a first object displacement may be a few mm or a small number of pixels/voxels, whereas a second object displacement be a few inches or a larger number of pixels/voxels. For example, a first rotational movement may involve rotating the selected virtual object by 10 degrees, whereas a second rotation movement may involve rotating the selected virtual object by 60 degrees. The first object displacement may have a smaller magnitude than the second object displacement, and the first rotational movement may have a smaller magnitude than the second rotational movement.

In some implementations, the manipulation granularity may be represented by a ratio defined by the input magnitude of user input received from the user divided by the output magnitude of the one or more manipulations of the selected virtual object within the virtual three-dimensional space. Other arithmetic and/or mathematical operations involving the input magnitude and the output magnitude are envisioned within the scope of this disclosure to derive the manipulation granularity and/or the manipulation sensitivity. In some implementations, the input magnitude and the output magnitude may be correlated.

Object manipulation component 120 may be configured to manipulate a (selected) virtual object within the virtual three-dimensional space by a (selected) type of manipulation, and in accordance with received user input. In some implementations, manipulation of a particular selected virtual object may be based on a correlation of a particular input magnitude of received user input to a particular output magnitude of one or more particular (selected) manipulations. For example, at a relatively low or coarse level of manipulation granularity a received user input having a small input magnitude may result in manipulation (e.g., movement of the selected virtual object) having a relatively large output magnitude. For example, a small mouse movement of 1 inch may result in moving the selected virtual object fast and/or far within user interface 134. Conversely, at a relatively high or fine level of manipulation granularity a received user input having a larger input magnitude may result in manipulation (e.g., movement of the selected virtual object) having a relatively small output magnitude. For example, a relatively larger mouse movement of 6-12 inches may result in moving the selected virtual object slowly and/or a short distance within user interface 134. A user may prefer a coarse manipulation granularity when speed is more important than accuracy, but a fine manipulation granularity when accuracy is more important than speed.

Granularity adjustment component 116 may be configured to adjust the manipulation granularity and/or the manipulation sensitivity based on one or more determinations by proximity component 112. For example, granularity adjustment component 116 may be configured to adjust the manipulation granularity based on the determined proximity information. Adjustment of the manipulation granularity may be performed such that the reduction in magnitude of the proximity information corresponds to an increase in the manipulation granularity. For example, prior to a particular adjustment of the manipulation granularity, the manipulation granularity may be relatively coarse, thus allowing rapid but not particularly accurate manipulations of a selected virtual object as long as the selected object is relatively far from other virtual objects. As one or move virtual objects move, the distance between the selected virtual object as the nearest other object (or the nearest surface of another object) may decrease. In other words, the magnitude of the proximity information of the selected object is reduced due to movement of virtual objects. Granularity adjustment component 116 may increase the manipulation granularity (e.g., from coarse to fine), thus allowing accurate but relatively slow manipulations of the selected virtual object. Adjustments in the manipulation granularity and/or manipulation sensitivity are not limited to two levels (e.g., coarse and fine), but may, in some implementations, have 3, 4, 5, 10, or more different levels. In some implementations, adjustments in the manipulation granularity and/or manipulation sensitivity may be gradual. For example, the adjustments may be smooth such that users experience a gradual transition between levels rather than discrete steps in different levels. In some implementations, the correlation between the input magnitude and the output magnitude may change due to adjustment by granularity adjustment component 116. For example, a first correlation may change to a second correlation that is different from the first correlation due to the adjustment.

Object manipulation component 120 may be configured to manipulate virtual objects within the virtual three-dimensional space. In some implementations, object manipulation component 120 may manipulate virtual objects in accordance with received particular user input. A particular output magnitude of a manipulation of a selected virtual object as requested may be based on the particular input magnitude and the current and/or adjusted manipulation granularity. For example, a 1-inch mouse movement as the received user input may effectuate a relatively large movement of a selected virtual object within user interface 134 responsive to the manipulation granularity being coarse and/or low. Once the selected virtual object approaches another virtual object and the manipulation granularity is adjusted to a fine level or relatively higher level, the same 1-inch mouse movement may effectuate a relatively small movement of the selected virtual object (compared to the previous movement of the same object).

Presentation component 122 may be configured to effectuate presentation of user interface 134 to the user. In some implementations, a user interface the same as or similar to user interface 134 may be presented through client computing platform 104. In some implementations, user interface 134 may be presented through display 132 of augmented reality device 130. The presentation of user interface 134 to the user may be accomplished by presenting views of user interface 134 superimposed over views of the real world such that both views are presented to the user simultaneously. User interface 134 may depict the manipulation of a user-selected virtual object within the virtual three-dimensional space. In some implementations, user interface 134 may be presented such that changes in color information are based on the proximity information.

In some implementations, server(s) 102, client computing platform(s) 104, and/or external resources 124 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include one or more processors configured to execute computer program components. The computer program components may be configured to enable an expert or user associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or ether components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from client computing platform(s) 104, and/or other information that enables server(s) 102 to Function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 126 may represent processing functionality of a plurality of devices operating in coordination. Processor(s) 128 may be configured to execute components 108, 110, 112, 114, 116, 118, 120, and/or 122, and/or other components. Processor(s) 128 may be configured to execute components 108, 110, 112, 114, 116, 118, 120, and/or 122, and/or other components by software; hardware; firmware; some combination of software, hardware, and/or firmware; and/or other mechanisms for configuring processing capabilities on processor(s) 128. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, and/or 122 are illustrated in FIG. 1 as being implemented within a single processing unit, in implementations in which processor(s) 128 includes multiple processing units, one or more of components 108, 110, 112, 114, 116, 118, 120, and/or 122 may be implemented remotely from the other components. The description of the functionality provided by the different components 108, 110, 112, 114, 116, 118, 120, and/or 122 described below is for illustrative purposes, and is not intended to be limiting, as any of components 108, 110, 112, 114, 116, 118, 120, and/or 122 may provide more or less functionality than is described. For example, one or more of components 108, 110, 112, 114, 116, 118, 120, and/or 122 may be eliminated, and some or all of its functionality may be provided by other ones of components 108, 110, 112, 114, 116, 118, 120, and/or 122. As another example, processor(s) 128 may be configured to execute one or more additional components that may perform some or all of the functionality attributed below to one of components 108, 110, 112, 114, 116, 118, 120, and/or 122.

Figure 2:
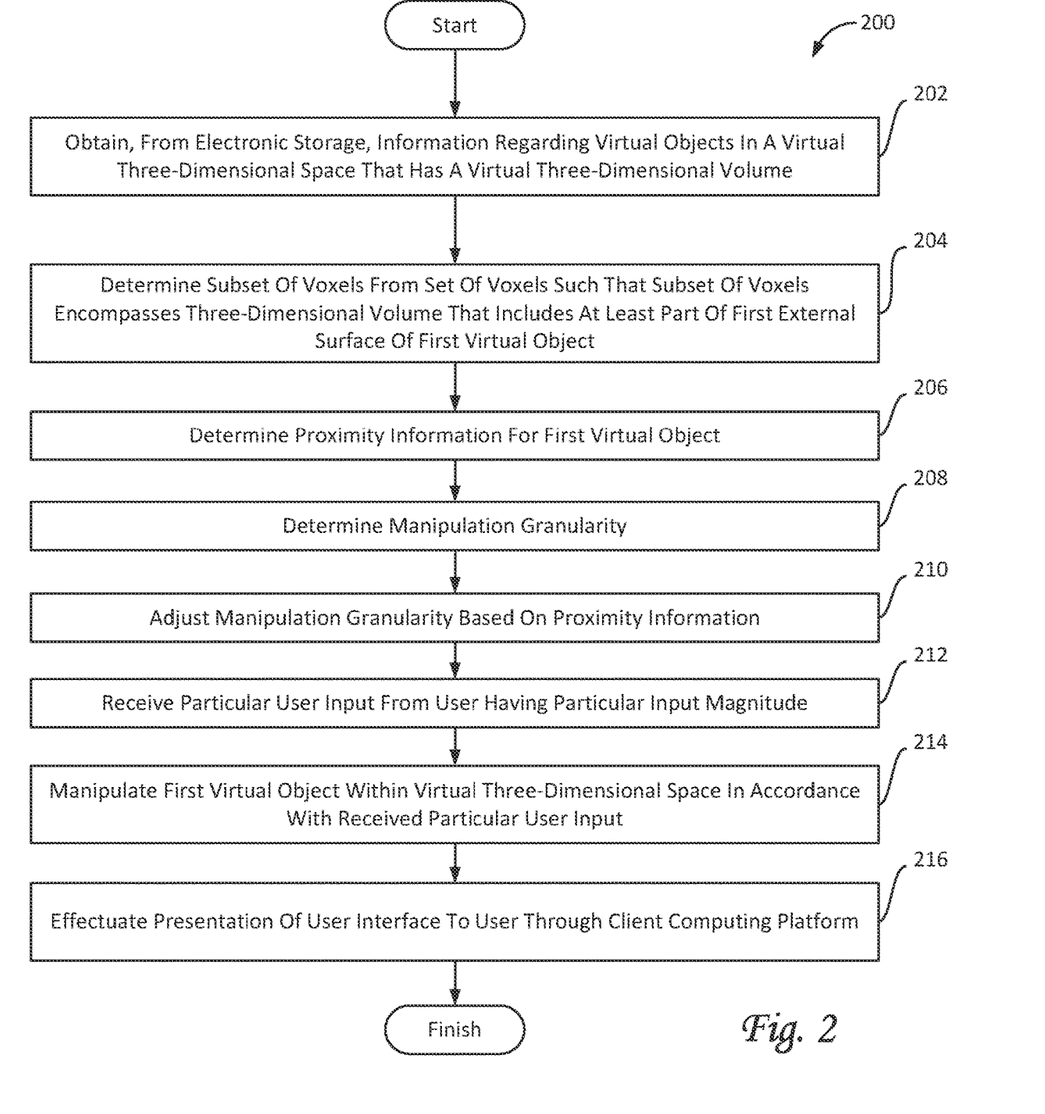
FIG. 2 illustrates a method for providing, to a user, a user interface for an environment that includes virtual objects, in accordance with one or more implementations.

FIG. 2 illustrates a method 200 for providing and/or presenting, to a user, a user interface for an environment that includes virtual objects, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining, from electronic storage, information regarding virtual objects in a virtual three-dimensional space that has a virtual three-dimensional volume. The virtual objects may include a first virtual object. The virtual three-dimensional space may include a set of voxels. Individual voxels correspond to individual virtual three-dimensional volumes within the virtual three-dimensional space. Individual voxels may be associated with individual distance values. The individual distance values may represent distances from the individual voxels to surfaces within the virtual three-dimensional space. Operation 202 may be performed by one or more hardware processors configured by machine-readable instructions including a component that is the same as or similar to virtual information component 108, in accordance with one or more implementations.

An operation 204 may include determining a subset of voxels from the set of voxels such that the subset of voxels encompasses a three-dimensional volume that includes at least part of a first external surface of the first virtual object. Operation 204 may be performed by one or more hardware processors configured by machine-readable instructions including a component that is the same as or similar to voxel determination component 110, in accordance with one or more implementations.

An operation 206 may include determining proximity information for the first virtual object. Determination of the proximity information may be based on aggregating a set of distance values for the determined subset of voxels. A reduction in magnitude of the proximity information may correspond to a reduction in one or more distances between the first virtual object and one or more surfaces within the virtual three-dimensional space. Operation 206 may be performed by one or more hardware processors configured by machine-readable instructions including a component that is the same as or similar to proximity component 112, in accordance with one or more implementations.

An operation 208 may include determining a manipulation granularity. The manipulation granularity may correlate an input magnitude of user input received from the user to an output magnitude of one or more manipulations of the first virtual object within the virtual three-dimensional space. The one or more manipulations may include one or more of translation, rotation, transformation, and/or other manipulations. Operation 208 may be performed by one or more hardware processors configured by machine-readable instructions including a component that is the same as or similar to manipulation granularity component 114, in accordance with one or more implementations.

An operation 210 may include adjusting the manipulation granularity based on the proximity information. Adjustment of the manipulation granularity may be performed such that the reduction in magnitude of the proximity information corresponds to an increase in the manipulation granularity. Operation 210 may be performed by one or more hardware processors configured by machine-readable instructions including a component that is the same as or similar to granularity adjustment component 116, in accordance with one or more implementations.

An operation 212 may include receiving particular user input from the user having a particular input magnitude. The particular user input may represent a request to manipulate the first virtual object within the virtual three-dimensional space. Operation 212 may be performed by one or more hardware processors configured by machine-readable instructions including a component that is the same as or similar to user input component 118, in accordance with one or more implementations.

An operation 214 may include manipulating the first virtual object within the virtual three-dimensional space in accordance with the received particular user input. A particular output magnitude of the manipulation of the first virtual object as requested may be based on the particular input magnitude and the adjusted manipulation granularity. Operation 214 may be performed by one or more hardware processors configured by machine-readable instructions including a component that is the same as or similar to object manipulation component 120, in accordance with one or more implementations.

An operation 216 may include effectuating presentation of the user interface to the user through a client computing platform. The user interface may depict the manipulation of the first virtual object within the virtual three-dimensional space. Operation 216 may be performed by one or more hardware processors configured by machine-readable instructions including a component that is the same as or similar to presentation component 122, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for providing, to a user, a user interface for an environment that comprises virtual objects, the system comprising:
   memory; and
   one or more hardware processors configured by machine-readable instructions stored in the memory to:
      obtain, from electronic storage, using a virtual information component, information regarding the virtual objects, wherein a virtual three-dimensional (3D) space comprising the virtual objects further comprises a set of voxels, wherein individual voxels of the set of voxels correspond to individual virtual 3D volumes;
      determine, using a subset determination component, a subset of voxels from the set of voxels such that the subset of voxels encompasses a 3D volume that comprises at least a part of a first external surface of a first virtual object of the virtual objects;
      determine, using a manipulation granularity component, a manipulation granularity, wherein the manipulation granularity correlates an input magnitude of user input received from the user to an output magnitude of one or more manipulations of the first virtual object, wherein a granularity adjustment component is configured to adjust the manipulation granularity such that a reduction in magnitude of proximity information of the first virtual object corresponds to an increase in the manipulation granularity; and
      effectuate, using a presentation component, presentation of the user interface to the user through a client computing platform, wherein the user interface depicts a manipulation of the first virtual object within the virtual 3D space.

2. The system of claim 1, wherein the environment is at least a virtual reality (VR) environment or an augmented reality environment (AR).

3. The system of claim 1, wherein a user input component receives the user input from the user, wherein the user input represents a selection of the first virtual object from the virtual objects in the virtual 3D space, and wherein the user input comprises manual motion by the user.

4. The system of claim 1, wherein a proximity component is configured to determine the proximity information for the first virtual object or proximity information for other virtual objects including, but not limited to, user-selected objects.

5. A method for providing, to a user, a user interface for an environment that comprises virtual objects, the method comprising:
   obtaining, by a system coupled to one or more hardware processors, from electronic storage, information regarding virtual objects, wherein a virtual 3D space comprising the virtual objects further comprises a set of voxels, wherein individual voxels of the set of voxels correspond to individual virtual 3D volumes;
   determining, by the system, a subset of voxels from the set of voxels such that the subset of voxels encompasses a 3D volume that comprises at least a part of a first external surface of a first virtual object of the virtual objects;
   determining, by the system, a manipulation granularity, wherein the manipulation granularity correlates an input magnitude of user input received from the user to an output magnitude of one or more manipulations of the first virtual object;
   adjusting, by the system, the manipulation granularity such that a reduction in magnitude of proximity information of the first virtual object corresponds to an increase in the manipulation granularity; and
   effectuating, by the system, presentation of the user interface to the user through a client computing platform, wherein the user interface depicts a manipulation of the first virtual object within the virtual 3D space.

6. The method of claim 5, wherein the environment is at least a virtual reality (VR) environment or an augmented reality environment (AR).

7. The method of claim 5, further comprising:
   receiving, by the system, the user input from the user, wherein the user input represents a selection of the first virtual object from the virtual objects in the virtual 3D space, and wherein the user input comprises manual motion by the user.

8. The method of claim 5, further comprising:
   aggregating, by the system, one or more distance values between the first virtual object and one or more real or virtual surfaces of a virtual 3D volume.

9. The system of claim 1, wherein the one or more manipulations comprise at least one of translation, rotation, scaling, or a combination thereof, of the first virtual object, and wherein the one or more manipulations are executed by an object manipulation component.

10. The system of claim 4, wherein determination of the proximity information comprises aggregating one or more distance values between the first virtual object and one or more real or virtual surfaces of a virtual 3D volume.

11. The system of claim 1, wherein the subset determination component is further configured to determine a 3D bounding box that fully encompasses the first virtual object.

12. The system of claim 11, wherein the subset determination component is further configured to determine the subset of voxels such that the 3D volume of the subset of voxels approximates or matches a 3D volume of the 3D bounding box.

13. The method of claim 5, wherein the one or more manipulations comprise at least one of translation, rotation, scaling, or a combination thereof, of the first virtual object.

14. The method of claim 5, further comprising:
determining, by the system, the proximity information for the first virtual object or proximity information for other virtual objects including, but not limited to, user-selected objects.

15. A non-transitory machine-readable medium comprising instructions that, when executed by one or more hardware processors of a machine, cause the machine to perform operations comprising:
obtain, by the one or more hardware processors, from electronic storage, information regarding virtual objects, wherein a virtual three-dimensional (3D) space comprising the virtual objects further comprises a set of voxels, wherein individual voxels of the set of voxels correspond to individual virtual 3D volumes;
determine, by the one or more hardware processors, a subset of voxels from the set of voxels such that the subset of voxels encompasses a 3D volume that comprises at least a part of a first external surface of a first virtual object of the virtual objects;
determine, by the one or more hardware processors, a manipulation granularity, wherein the manipulation granularity correlates an input magnitude of user input received from a user to an output magnitude of one or more manipulations of the first virtual object;
adjust, by the one or more hardware processors, the manipulation granularity such that a reduction in magnitude of proximity information of the first virtual object corresponds to an increase in the manipulation granularity; and
effectuate, by the one or more hardware processors, presentation of a user interface to the user through a client computing platform, wherein the user interface depicts a manipulation of the first virtual object within the virtual 3D space.

16. The non-transitory machine-readable medium of claim 15, wherein the instructions are further executable to cause the one or more hardware processors to:
receive, by the one or more hardware processors, the user input from the user, wherein the user input represents a selection of the first virtual object from the virtual objects in the virtual 3D space, and wherein the user input comprises manual motion by the user.

17. The non-transitory machine-readable medium of claim 15, wherein the instructions are further executable to cause the one or more hardware processors to:
determine, by the one or more hardware processors, the proximity information for the first virtual object or proximity information for other virtual objects including, but not limited to, user-selected objects; and
aggregate, by the one or more hardware processors, one or more distance values between the first virtual object and one or more real or virtual surfaces of a virtual 3D volume.

* * * * *